(12) United States Patent
Omi

(10) Patent No.: US 7,057,159 B2
(45) Date of Patent: Jun. 6, 2006

(54) EMITTING LIGHT SOURCE APPARATUS FOR USE IN OPTICAL ENCODER

(75) Inventor: Toshihiro Omi, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 451 days.

(21) Appl. No.: 10/067,075

(22) Filed: Feb. 4, 2002

(65) Prior Publication Data

US 2002/0104960 A1  Aug. 8, 2002

(30) Foreign Application Priority Data

Feb. 5, 2001  (JP)  ............................. 2001-028128

(51) Int. Cl.
*G01D 5/34* (2006.01)

(52) U.S. Cl. .................. 250/231.13; 250/239; 356/616

(58) Field of Classification Search ............. 250/251.1, 250/231.11, 231.12, 231.13, 555, 231.14, 250/231.15, 231.16, 234.17, 231.18, 231.19, 250/239; 356/395–401, 616–620
See application file for complete search history.

(56) References Cited

U.S. PATENT DOCUMENTS

| | | | | |
|---|---|---|---|---|
| 4,499,374 A | * | 2/1985 | Kabaya | 250/237 G |
| 4,952,946 A | * | 8/1990 | Clark et al. | 347/248 |
| 5,113,071 A | * | 5/1992 | Sawada et al. | 250/237 G |
| 5,327,218 A | * | 7/1994 | Igaki | 356/499 |
| 5,479,010 A | * | 12/1995 | Shimomura et al. | 250/231.13 |
| 5,841,133 A | * | 11/1998 | Omi | 250/231.13 |
| 5,995,229 A | | 11/1999 | Omi | |
| 6,240,652 B1 | * | 6/2001 | Bobel et al. | 33/707 |
| 6,410,911 B1 | * | 6/2002 | Omi | 250/231.13 |

FOREIGN PATENT DOCUMENTS

| | | |
|---|---|---|
| JP | 01-097813 | 4/1989 |
| JP | 05-079854 | 3/1993 |
| JP | 07-167676 | 7/1995 |

OTHER PUBLICATIONS

English translation of Yasuda JP 01-097813.*

* cited by examiner

*Primary Examiner*—Thanh X. Luu
*Assistant Examiner*—Stephen Yam
(74) *Attorney, Agent, or Firm*—Rankin, Hill, Porter & Clark LLP

(57) ABSTRACT

A light-emitting chip mounted on a leadframe has a light-emitting surface substantially orthogonal to an optical grating surface of a scale and in a direction of an optical grating. A transparent resin is molded so that it seals both the light-emitting chip and the leadframe. A first optical element reflects the light from the light-emitting chip substantially parallel to the optical grating surface and in a direction orthogonal to the direction of the optical grating. A second optical element reflects the parallel light from the first optical element and illuminates the optical grating over a specified area in the direction of the optical grating as the reflected parallel light is converged toward the optical grating.

8 Claims, 2 Drawing Sheets

EMITTING LIGHT SOURCE APPARATUS FOR USE IN OPTICAL ENCODER

BACKGROUND OF THE INVENTION

1. Field of the Invention

The present invention relates to an emitting light source apparatus for use in a reflecting optical encoder.

2. Description of the Related Art

Two types of optical encoder are known; the first is a transmission type; the second is a reflection type. The transmission type includes a scale, a light-emitting element and a light-receiving element. The scale has an optical grating formed along an axis of measurement. The light-emitting element and the light-receiving element are provided on opposite sides of the scale. In the transmission type, the light from the light-emitting element is applied to the scale and the light transmitted through the scale is received by the light-receiving element. In the reflection type, the light-emitting element and the light-receiving element are provided on one side of the scale, and the light from the light-emitting element is applied to the scale and the light reflected from the scale is received by the light-receiving element.

The reflection type can be constructed in a smaller size than the transmission type since the light-emitting element and the light-receiving element can be provided on one side of the scale. However, the current model of commercially available reflection-type optical encoder has a structure that requires precise positioning of the light-emitting and receiving elements. In addition, it needs a wiring board to form signal-carrying wires for these elements. Because of this complexity in structure, the size of the reflection-type optical encoder cannot be reduced to a satisfactory level.

In order to cope with this problem, the Applicant previously proposed the idea of using a resin block to realize a compact sensor head (U.S. Pat. No. 5,995,229). However, the demand for a further decrease in size and thickness is growing. Further, there is a need to develop an emitting light source apparatus capable of more precise detection.

SUMMARY OF THE INVENTION

An object of the invention is to provide an emitting light source apparatus for use in an optical encoder that can be constructed in an even smaller size and thickness and which still allows for more precise detection.

To attain this object, the invention provides an emitting light source apparatus of a reflection-type for use in an optical encoder which applies light to a reflecting scale having an optical grating formed along an axis of measurement and which receives the reflected light from the scale with a light-receiving element to output a displacement signal. The apparatus comprises: a leadframe disposed opposite to the scale; a light-emitting chip mounted on the leadframe which has a light-emitting surface substantially orthogonal to an optical grating surface of the scale and in a direction of the optical grating (along the axis of measurement); and a molded transparent resin sealing both the light-emitting chip and the leadframe. The transparent resin includes first and second optical elements. The first optical element is provided at an end face of the molded transparent resin which faces the light-emitting surface of the light-emitting chip. The first optical element reflects the light from the light-emitting chip substantially parallel to the optical grating surface and in a direction orthogonal to the direction of the optical grating. The second optical element is provided at the other end face of the molded transparent resin which is remote from the light-emitting surface of the light-emitting chip. The second optical element reflects the parallel light from the first optical element toward the optical grating and illuminates the optical grating over a specified area in the direction of the optical grating as the reflected parallel light is converged toward the optical grating.

In the emitting light source apparatus of the invention for use in the optical encoder, light is emitted from the light-emitting chip in a direction substantially orthogonal to the optical grating surface and substantially orthogonal to the direction of the optical grating. The light is then reflected by the first optical element substantially parallel to the optical grating surface and in a direction orthogonal to the direction of the optical grating. Then, the light reflected by the first optical element is reflected by the second optical element toward the optical grating and applied over a specified area in the direction of the optical grating in the optical grating as it is converged toward the optical grating.

In order to form a concave mirror that causes the light emitted from the top surface of the light-emitting element to return to the scale, a convex surface must be formed in the top of the molded transparent resin at a specified distance away from the light-emitting chip. In the invention, light is emitted from the light-emitting chip in a direction substantially orthogonal to the optical grating surface and substantially orthogonal to the direction of the optical grating, namely, sidewise if the scale is positioned under the light source apparatus; this design contributes to reducing the thickness of the light source apparatus.

In addition, the light from the light-emitting chip is reflected substantially parallel to the optical grating surface and in a direction orthogonal to the direction of the optical grating. Therefore, unevenness in light can be made uniform even if the light-emitting chip uses a point light source. In other words, size reduction can be realized without the constraints of the light source.

Further, by means of the second optical element, the parallel light from the first optical element is caused to illuminate the optical grating over a specified area in the direction of the optical grating as it is converged toward the optical grating. In other words, an increased amount of light can be gained by the second optical element which allows the parallel light from the first optical element to be converged toward the optical grating and this contributes to reducing the size of the light-emitting chip.

In the emitting light source apparatus, it is preferable that the second optical element reflects the parallel light from the first optical element toward the optical grating and illuminates the optical grating over an area wider than a length of the light-receiving element in the direction of the optical grating on the optical grating as the reflected parallel light is converged toward the optical grating.

With this design, the parallel light from the second optical element illuminates the optical grating over an area wider than the length of the light-receiving element in the direction of the optical grating and the reflected light from the optical grating is received by the light-receiving element. In other words, the received light contains the information from the light applied over an area wider than the length of the light-receiving element in the direction of the optical grating. Hence, the errors due to waviness in the scale, stain and pitch deviations can be sufficiently averaged to enable more precise detection.

The second optical element preferably includes a plano-convex cylindrical lens consisting of a flat surface on which the parallel light from the first optical element is incident and a convex spherical surface on the other side of the lens opposite to the flat surface. It is also preferred that the first optical element is composed of a spherical or aspheric lens having the focus at the light-emitting chip. With these designs, the above-described advantages of the invention can be achieved by a comparatively simple and, hence, inexpensive structure.

In a more preferred embodiment, a reflective film is formed on an outside surface of the first or second optical element. With this design, the effects of extraneous light can be attenuated.

DETAILED DESCRIPTION OF THE INVENTION

An embodiment for carrying out the invention is described below with reference to the accompanying drawings.

Figure 1:
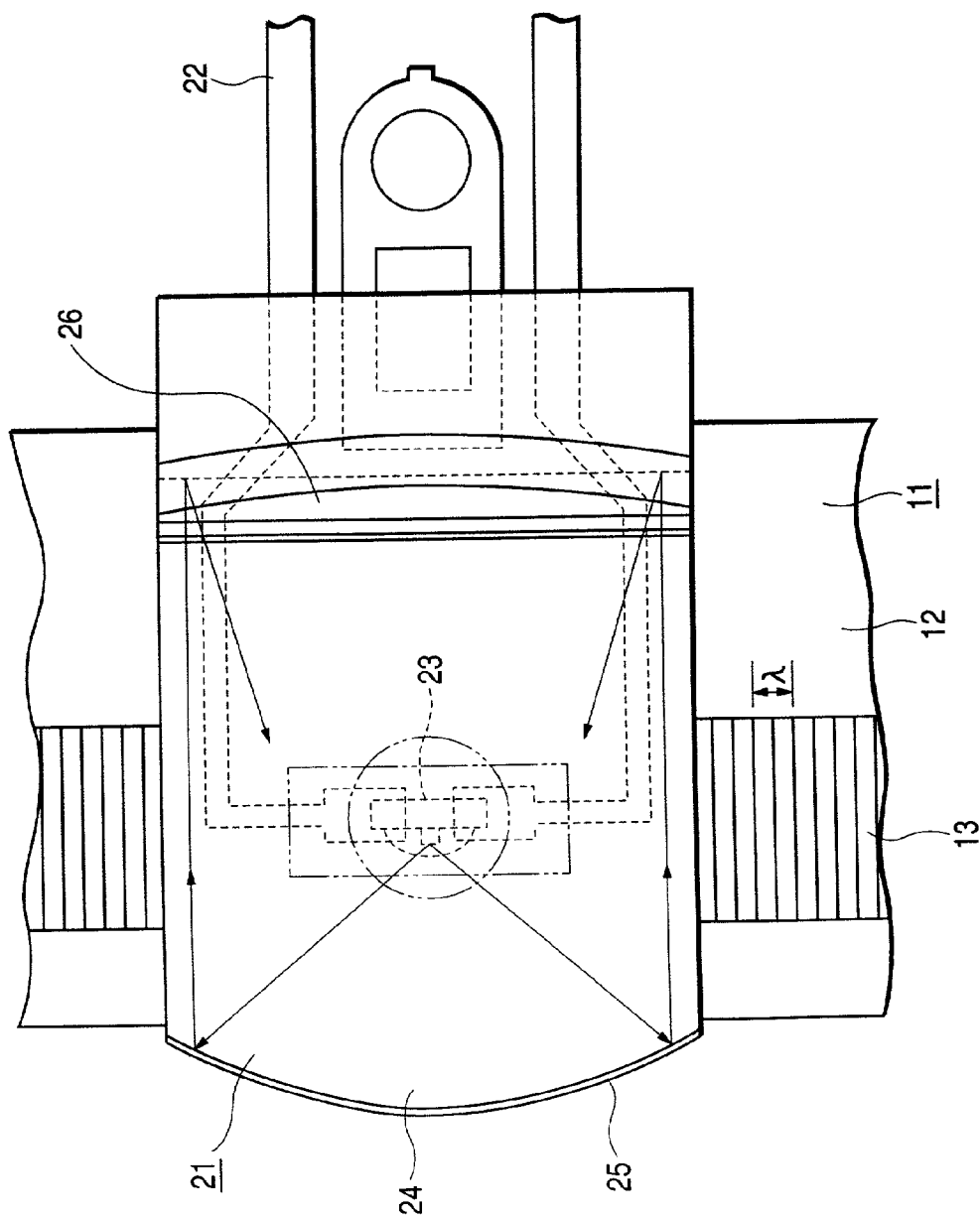
FIG. 1 is a plan view showing an embodiment of an optical encoder according to the invention.
Figure 2:
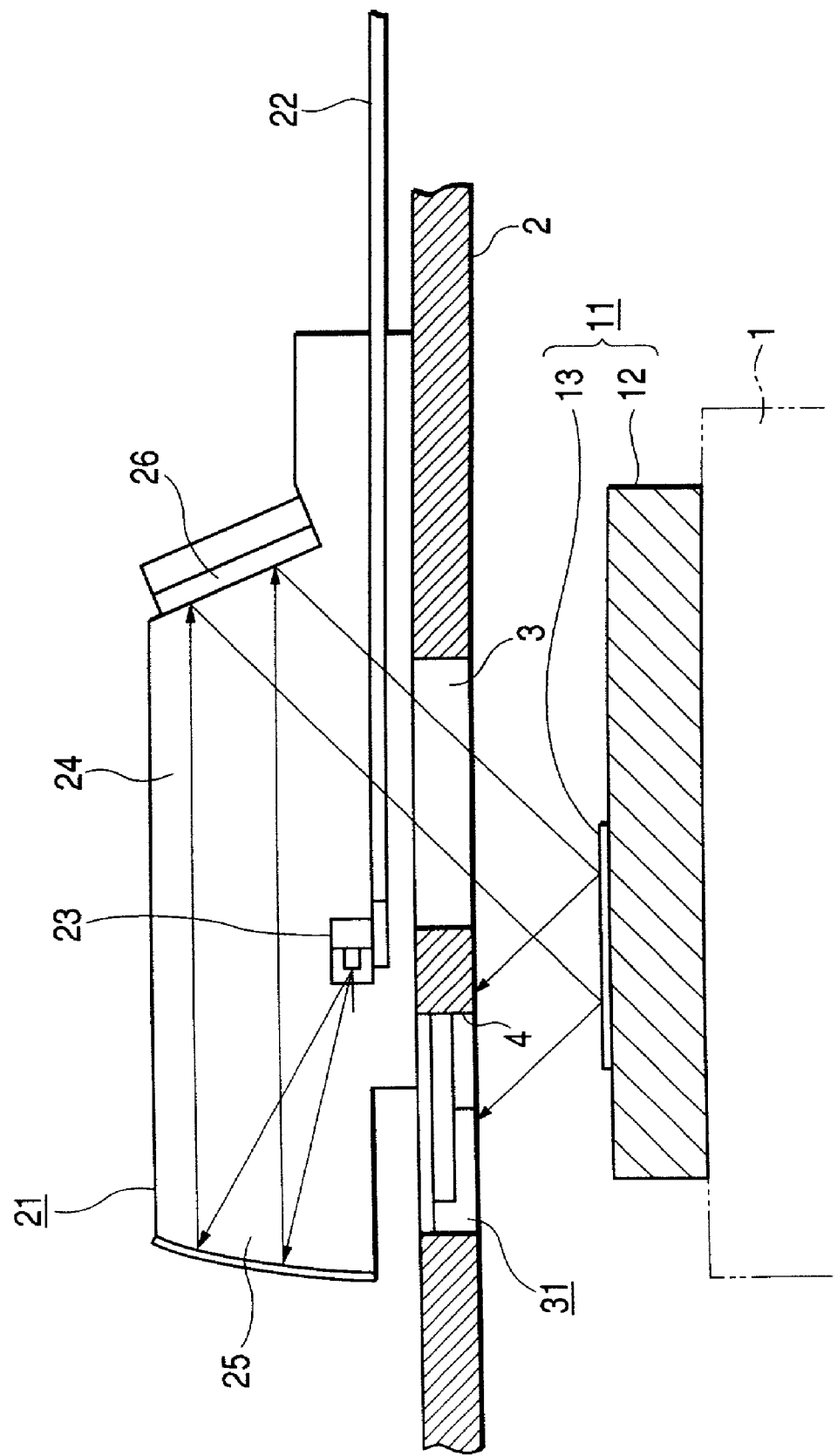
FIG. 2 is a sectional view of the embodiment.

FIG. 1 is a plan view of an optical encoder in an embodiment according to the invention and FIG. 2 is a sectional view of the optical encoder. The optical encoder comprises two members (first member 1 and second member 2), a reflecting scale 11, an emitting light source apparatus 21, and a light-receiving unit 31. The first and second members 1 and 2 move relative to each other (in a direction orthogonal to the paper on which FIG. 2 is drawn). The reflecting scale 11 is provided on the first member 1. The emitting light source apparatus 21 is provided on the second member 2 to emit light which illuminates the scale 11. The light-receiving unit 31 is provided on the second member 2 and includes a light-receiving element that receives the reflected light from scale 11 to output a displacement signal. The second member 2 has two holes 3, 4. The hole 3 is used for passing the light from emitting light source apparatus 21 therethrough to illuminate the scale 11. The hole 4 is used for installing the light-receiving unit 31 to the second member 2.

The scale 11 comprises a scale base 12 and an optical grating 13. The scale base 12 has a strip form made of a material having a small linear expansion coefficient, as exemplified by glass. The optical grating 13 is formed on the surface of scale base 12 in the direction of relative movement of members 1 and 2 (along the axis of measurement). The optical grating 13 consists of a light-reflecting portion and a non-reflecting portion which alternate on a given pitch (λ) in the direction of relative movement of members 1 and 2 (along the axis of measurement).

The emitting light source apparatus 21 comprises a leadframe 22, a light-emitting chip 23, and a molded transparent resin 24. The light-emitting chip 23 is mounted on the leadframe 22 in such a manner that it has a light-emitting surface orthogonal to a surface of the optical grating 13 of the scale 11 and in a direction of the optical grating 13 (along the axis of measurement) (i.e., to the left of FIG. 2). The light-emitting chip 23 emits light in a direction substantially orthogonal to the optical grating surface and in a direction substantially orthogonal to the direction of optical grating 13. The molded transparent resin 24 on the second member 2 seals both light-emitting chip 23 and the leadframe 22. In the embodiment, the light-emitting chip 23 is composed of a semiconductor light-emitting device (LED).

A first optical element 25 is provided at an end face of the molded transparent resin 24 which faces the light-emitting surface of light-emitting chip 23. The first optical element 25 reflects the light from light-emitting chip 23 substantially parallel to the optical grating surface and in a direction orthogonal to the direction of optical grating 13. A second optical element 26 is provided at the other end face which is remote from the light-emitting surface of the light-emitting chip 23. The second optical element 26 reflects the parallel light from first optical element 25 toward the optical grating 13 and illuminates the optical grating over a specified area in the direction of optical grating 13 (at least the area of the light-receiving surface of light-receiving unit 31 that is covered by the reflected light from optical grating 13, or a wider area) as the reflected parallel light is converged toward the optical grating 13.

The first optical element 25 is composed of a first lens (spherical or aspheric lens) at an end face of molded transparent resin 24 which has the focus at light-emitting chip 23. The second optical element 26 is composed of a planoconvex cylindrical lens consisting of a (vertical) flat surface on which the parallel light from the first optical element 25 is incident and a convex spherical surface on the other side (at an outside surface of the molded transparent resin 24). The outside surfaces of these lenses are coated with a reflective film.

The light-receiving unit 31 comprises an array of light-receiving elements PDA (not shown). Given the pitch (λ) of the optical grating 13 on scale 11, the array PDA consists of at least one set of photodiodes, each set consisting of four photodiodes arranged on a pitch of 3λ/4. As the scale 11 is displaced (due to relative displacement of the first and second members 1 and 2), the array PDA will produce displacement signals of four phases (A, BB, AB and B) that are respectively offset by 270°.

In the embodiment, the light-emitting chip 23 emits the light in a direction substantially orthogonal to the optical grating surface and substantially orthogonal to the direction of optical grating 13. The light emitted from the light-emitting chip 23 is reflected by the first optical element 25 substantially parallel to the optical grating surface and in a direction orthogonal to the direction of optical grating 13. Then, the light reflected by the first optical element 25 is reflected by the second optical element 26 toward the optical grating 13 and applied over a wider area than the light-receiving surface of light-receiving unit 31 in the direction of the optical grating 13 in the optical grating 13 as it is converged toward the optical grating 13.

In order to form a concave mirror that causes the light emitted from the top surface of the light-emitting element to return to the scale, a convex surface must be formed in the top of the molded transparent resin at a specified distance away from the light-emitting chip. In the embodiment, light is emitted from light-emitting chip 23 in a direction substantially orthogonal to the optical grating surface and substantially orthogonal to the direction of optical grating 13. This design contributes to reducing the thickness of the light source apparatus. It is interesting to note that the thickness of the molded transparent resin 24 can be reduced to about 4 mm.

In addition, the light from light-emitting chip 23 is reflected substantially parallel to the optical grating surface and in a direction orthogonal to the direction of optical grating 13, so unevenness in light can be made uniform even if the light-emitting chip 23 uses a point light source. In other words, size reduction can be realized without the constraints of the light source.

Further, by means of the second optical element 26, the parallel light from the first optical element 25 is caused to illuminate the optical grating over a specified area in the direction of optical grating 13 as it is converged toward optical grating 13. In other words, an increased amount of light can be gained by the second optical element 26 which allows the parallel light from the first optical element 25 to be converged toward the optical grating 13 and this contributes to reducing the size of the light-emitting chip 23.

Further, the second optical element 26 causes the parallel light from the first optical element 25 to illuminate the optical grating 13 over an area wider than the length of light-receiving unit 31 (specifically, the light-receiving surface of light-receiving unit 31) in the direction of the optical grating 13. In other words, the received light contains the information from the light illuminating the optical grating 13 over an area wider than the length of light-receiving unit 31 (specifically, the light-receiving surface of light-receiving unit 31) in the direction of optical grating 13. Hence, the errors due to waviness in the scale, stain and pitch deviations can be sufficiently averaged to enable more precise detection.

The first optical element 25 includes a spherical or aspheric lens having the focus at light-emitting chip 23. In addition, the second optical element 26 includes a planoconvex cylindrical lens consisting of a flat surface on which the parallel light from the first optical element 25 is incident and a convex spherical surface on the other side. With these designs, the above-described advantages of the invention can be achieved by a comparatively simple and, hence, inexpensive structure.

In addition, a reflective film is formed on the outside surface of the first optical element 25 or the second optical element 26. With this design, the effects of extraneous light can be attenuated.

As a further advantage, light-emitting chip 23 and leadframe 22 are both sealed in the molded transparent resin and this contributes to increased consistency in product quality.

It should be noted that the invention is by no means limited to the construction described in the embodiment and may include the following modifications.

As for the first optical element 25, the lens described in the embodiment is not the sole example and other collimator lenses may also be employed.

As for the second optical element 26, the lens described in the embodiment is not the sole example and other optical elements may also be employed, as exemplified by a diffusing plate, a spectroscopic grating and a diffraction grating.

In the embodiment, the light-receiving unit 31 is a separate member from the emitting light source apparatus 21; however, if desired, the light-receiving unit 31 may be assembled into the emitting light source apparatus 21 as an integral part of it. This offers the advantages of reducing the number of steps in the installation process and eliminating the need to adjust the light-receiving unit 31 and the emitting light source apparatus 21 during their installation.

It should also be noted that as for the light-emitting chip 23, the semiconductor light-emitting device (LED) described in the embodiment is not the sole example and laser light sources may also be employed.

The emitting light source apparatus of the invention for use in the optical encoder can be utilized as a light source apparatus that can be constructed in an even smaller size and thickness and which still allows for more precise detection.

What is claimed is:

1. An emitting light source apparatus of a reflection-type for use in an optical encoder which applies light to a reflecting scale having an optical grating formed along an axis of measurement and which receives the reflected light from the scale with a light-receiving element to output a displacement signal, said apparatus comprising:
    a leadframe disposed opposite to said scale;
    a light-emitting chip mounted on said leadframe, said light-emitting chip having a light-emitting surface substantially orthogonal to an optical grating surface of said scale and in a direction of the optical grating; and
    a molded transparent resin sealing both the light-emitting chip and said leadframe,
    wherein said transparent resin includes a first optical element provided at an end face of said molded transparent resin which faces the light-emitting surface of said light-emitting chip, and a second optical element provided at the other end face of said molded transparent resin which is remote from the light-emitting surface of said light-emitting chip, said first optical element reflecting the light from said light-emitting chip substantially parallel to the optical grating surface and in a direction orthogonal to the direction of the optical grating, said second optical element including a planoconvex cylindrical lens consisting of a flat surface on a side of the lens on which the parallel light from said first optical element is incident and a convex spherical surface on the other side of the lens, said second optical element reflecting the parallel light from said first optical element and focusing the reflected light toward the optical grating and illuminating the optical grating over a specified area in the direction of the optical grating on the optical grating as the focused light is converged toward the optical grating.

2. An emitting light source apparatus of a reflection-type for use in an optical encoder which applies light to a reflecting scale having an optical grating formed along an axis of measurement and which receives the reflected light from the scale with a light-receiving element to output a displacement signal, said apparatus comprising:
    a leadframe disposed opposite to said scale;
    a light-emitting chip mounted on said leadframe, said light-emitting chip having a light-emitting surface substantially orthogonal to an optical grating surface of said scale and in a direction of the optical grating; and
    a molded transparent resin sealing both the light-emitting chip and said leadframe,
    wherein said transparent resin includes a first optical element provided at an end face of said molded transparent resin which faces the light-emitting surface of said light-emitting chip, and a second optical element provided at the other end face of said molded transparent resin which is remote from the light-emitting surface of said light-emitting chip, said first optical element reflecting the light from said light-emitting chip substantially parallel to the optical grating surface and in a direction orthogonal to the direction of the optical grating, said second optical element, which includes a planoconvex cylindrical lens consisting of a flat surface on a side of the lens on which the parallel light from said first optical element is incident and a convex spherical surface on the other side of the lens, wherein incident parallel light from said first optical element passes through said flat surface and is reflected by said convex spherical surface back through said planoconvex cylindrical lens flat surface toward the optical grating and illuminates the optical grating over a specified area in the direction of the optical grating on the optical grating as the reflected parallel light is converged toward the optical grating.

3. The emitting light source apparatus according to claim 2, wherein said second optical element reflects the parallel light from said first optical element and focuses the reflected light toward the optical grating and illuminates the optical grating over an area wider than a length of said light-receiving element in the direction of the optical grating as said reflected parallel light is converged toward the optical grating.

4. The emitting light source apparatus according to claim 2, wherein said first optical element includes a spherical or aspheric lens having the focus at said light-emitting chip.

5. The emitting light source apparatus according to claim 2, further comprising:
a reflective film formed on an outside surface of said first or second optical element.

6. The emitting light source apparatus according to claim 2, wherein said light-receiving element is formed integrally to the said emitting light source apparatus.

7. The emitting light source apparatus according to claim 2, wherein said light-emitting chip is positioned above said light-receiving element.

8. The emitting light source apparatus according to claim 2, wherein said second optical element is positioned above said light-receiving element.

* * * * *